J. BUTLER.
GENERATING FIXED GASES FROM HYDROCARBON VAPORS.
No. 84,259.           Patented Nov. 24, 1868.
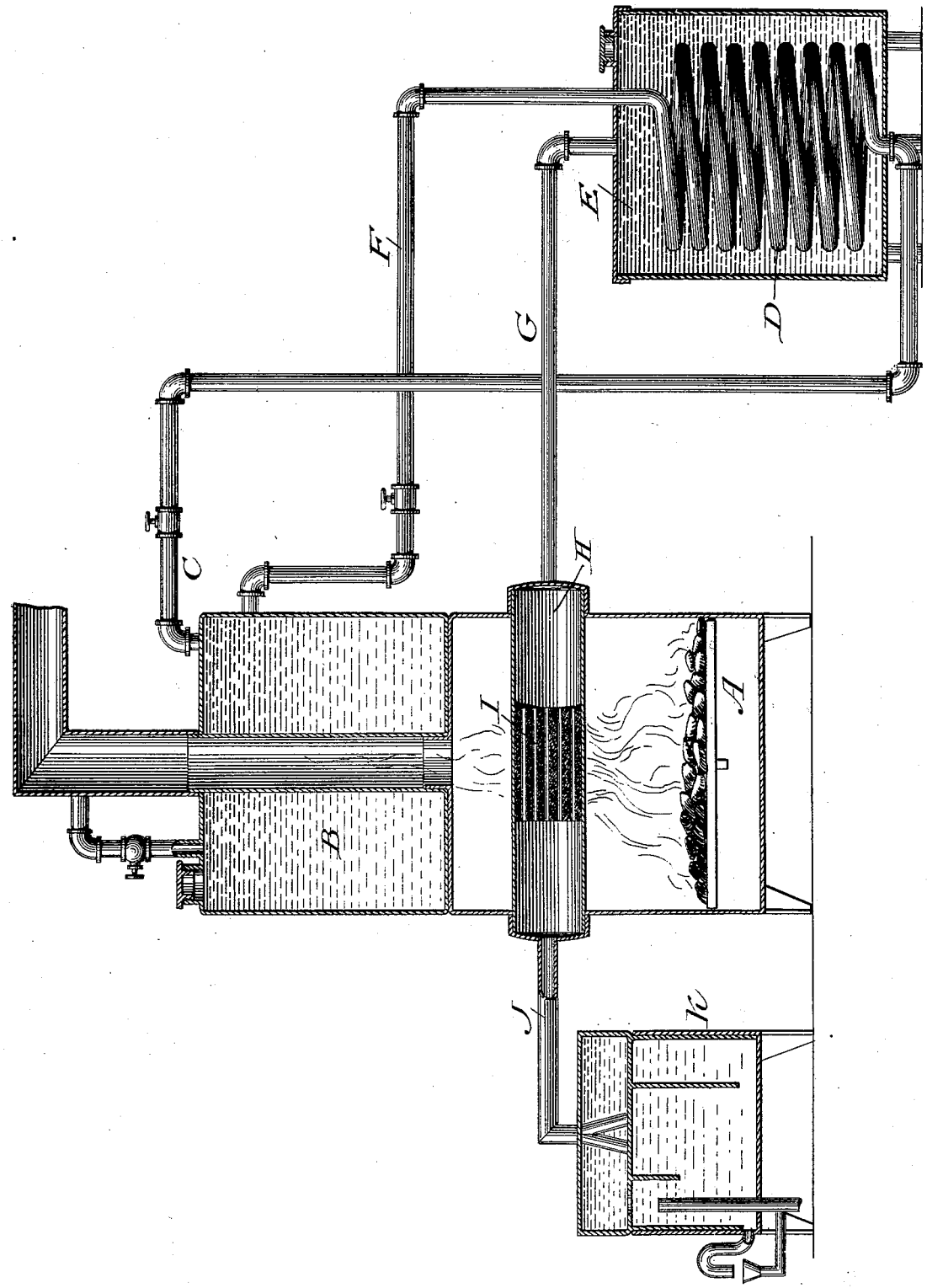

UNITED STATES PATENT OFFICE.

JOHN BUTLER, OF BROOKLYN, NEW YORK.

IMPROVED METHOD OF GENERATING FIXED GASES FROM HYDROCARBON VAPORS.

Specification forming part of Letters Patent No. 84,259, dated November 24, 1868.

*To all whom it may concern:*

Be it known that I, JOHN BUTLER, of Brooklyn, in the county of Kings, in the State of New York, have invented a new and Improved Method of Generating Fixed Gas from the Vapors of Hydrocarbons; and I do hereby declare that the following is a full and exact description thereof, reference being had to the accompanying drawings.

My invention has for its object to furnish an improved apparatus for vaporizing benzine and other hydrocarbons, and then converting the vapor into permanent gas; and it consists in reheating or roasting the vapors when divided up or separated into small streams, and in the construction and combination of the apparatus by which this is effected, as hereinafter more fully described.

A is the furnace or fire-chamber which supplies the heat for vaporizing the substance from which the gas is to be made, and for afterward reheating or roasting said vapor to change it into permanent gas. B is the boiler in which the steam is generated for vaporizing the hydrocarbon.

From the boiler B the steam passes through the pipe C into the coil D, coiled within the vaporizer E, from which coil it passes back into the boiler B through the pipe F.

The substance to be vaporized is in the vaporizer E, and as the vapor is formed by the heat from the coil D it passes through the pipe G into the chamber H placed in the furnace or fire-chamber A.

I is a block of charcoal, made of such a size as to fit into the chamber H, and which is perforated longitudinally with numerous perforations, through which the vapor passes, being thus divided into small streams, so that it may be acted upon in all its parts by the heat as it passes through said perforated block I. From the chamber H the gas passes through the pipe J into the condenser K, where any unchanged vapor that may remain in the gas is removed in the ordinary manner. From the condenser K the gas passes through the pipe L into the gas-holder, which is not shown in the drawing, and about the construction of which there is nothing new.

It should be observed that a perforated block of wood, of the proper size, may be placed in the chamber H, where it will be converted into charcoal by the action of the heat of the furnace A.

I do not confine myself to wood for forming the charcoal block I, as above stated, but have found that ordinary pulverized charcoal, kneaded with flour or starch, or any analogous substance, and fitting more closely into the receptacle H, and being perforated while in a plastic state, and also that common coke pulverized and mixed in the foregoing manner, are equally advantageous. It should also be observed that any other suitable material may be used instead of the charcoal I which will divide the vapor into small streams and will insure its being properly heated or roasted.

In case of benzine or other hydrocarbons which can be vaporized at a comparatively low temperature, the heat of steam in the coil D will be sufficient; but in the case of other hydrocarbons which require a higher temperature for their vaporization, some other substance must be placed in the boiler B, the vapor of which will have a greater heat than the vapor of water, so as to heat the coil D to the requisite temperature.

Having thus described my invention, what I claim as new, and desire to secure by Letters Patent of the United States, is—

1. An arrangement of mechanism for roasting hydrocarbon vapors or changing them into permanent gases by exposing them to heat while minutely divided or separated into small streams, substantially as herein shown and described.

2. The combination and arrangement of the furnace or fire-chamber A, boiler B, vaporizer E, roasting-chamber H, and perforated charcoal block I, or its equivalent, with each other, substantially as herein shown and described, and for the purpose set forth.

3. The perforated charcoal block I, prepared and operating substantially as herein shown and described, in combination with the roasting-chamber H, as and for the purpose set forth.

JNO. BUTLER. [L. S.]

Witnesses:
CHARLES J. EAMES,
GEO. H. DAVIS.